(12) United States Patent
Schmidt et al.

(10) Patent No.: US 11,748,981 B2
(45) Date of Patent: *Sep. 5, 2023

(54) DEEP LEARNING METHOD FOR PREDICTING PATIENT RESPONSE TO A THERAPY

(71) Applicant: AstraZeneca Computational Pathology GmbH, Munich (DE)

(72) Inventors: Guenter Schmidt, Munich (DE); Nicolas Brieu, Munich (DE); Ansh Kapil, Munich (DE); Jan Martin Lesniak, Munich (DE)

(73) Assignee: AstraZeneca Computational Pathology GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,228

(22) Filed: Apr. 27, 2022

(65) Prior Publication Data
US 2022/0254020 A1 Aug. 11, 2022

Related U.S. Application Data

(63) Continuation of application No. 16/705,238, filed on Dec. 6, 2019, now Pat. No. 11,348,231.

(Continued)

(51) Int. Cl.
*G06V 10/82* (2022.01)
*G06T 7/00* (2017.01)
(Continued)

(52) U.S. Cl.
CPC .............. *G06V 10/82* (2022.01); *G01N 1/30* (2013.01); *G06F 18/2414* (2023.01);
(Continued)

(58) Field of Classification Search
CPC .... G06V 10/82; G06V 10/764; G06V 20/695; G06V 20/698; G06T 7/0012;
(Continued)

(56) References Cited

U.S. PATENT DOCUMENTS 11,348,231 B2 * 5/2022 Schmidt .................. G01N 1/30
2020/0342597 A1 10/2020 Chukka et al. ........ G06T 7/0012
(Continued)

OTHER PUBLICATIONS

N. Brieu et al., "Domain Adaptation-based Augmentation for Weakly Supervised Nuclei Detection", ARXIV.ORG, Cornell University Library, 201 Olin Library, Cornell University, Ithaca, NY 14853, Jul. 10, 2019 XP081440331 (8 pages).
(Continued)

*Primary Examiner* — Jon Chang
(74) *Attorney, Agent, or Firm* — Imperium Patent Works; Darien K. Wallace

(57) ABSTRACT

A method for indicating how a cancer patient will respond to a predetermined therapy relies on spatial statistical analysis of classes of cell centers in a digital image of tissue of the cancer patient. The cell centers are detected in the image of stained tissue of the cancer patient. For each cell center, an image patch that includes the cell center is extracted from the image. A feature vector is generated based on each image patch using a convolutional neural network. A class is assigned to each cell center based on the feature vector associated with each cell center. A score is computed for the image of tissue by performing spatial statistical analysis based on classes of the cell centers. The score indicates how the cancer patient will respond to the predetermined therapy. The predetermined therapy is recommended to the patient if the score is larger than a predetermined threshold.

20 Claims, 10 Drawing Sheets

Related U.S. Application Data

(60) Provisional application No. 62/776,443, filed on Dec. 6, 2018.

(51) Int. Cl.
| | |
|---|---|
| *G06V 20/69* | (2022.01) |
| *G06V 10/764* | (2022.01) |
| *G06T 7/136* | (2017.01) |
| *G06T 7/33* | (2017.01) |
| *G06T 7/35* | (2017.01) |
| *G01N 1/30* | (2006.01) |
| *G06F 18/2413* | (2023.01) |

(52) U.S. Cl.
CPC .......... *G06T 7/0012* (2013.01); *G06T 7/136* (2017.01); *G06T 7/337* (2017.01); *G06T 7/35* (2017.01); *G06V 10/764* (2022.01); *G06V 20/695* (2022.01); *G06V 20/698* (2022.01); *G01N 2800/52* (2013.01); *G01N 2800/7028* (2013.01); *G06T 2207/20084* (2013.01); *G06T 2207/30024* (2013.01); *G06T 2207/30242* (2013.01)

(58) Field of Classification Search
CPC .......... G06T 7/136; G06T 7/337; G06T 7/35; G06T 2207/20084; G06T 2207/30242; G06T 2207/30024; G01N 1/30; G01N 2800/52; G01N 2800/7028; G06F 18/2414

See application file for complete search history.

(56) References Cited

U.S. PATENT DOCUMENTS

| | | | |
|---|---|---|---|
| 2020/0388029 A1 | 12/2020 | Saltz et al. | ............ G06T 7/0012 |
| 2021/0216746 A1* | 7/2021 | Nie | ....................... G06F 18/231 |

OTHER PUBLICATIONS

K. Enfield et al., "Hyperspectral cell sociology reveals spatial tumor-immune cell interactions associated with lung cancer recurrence", Journal for Immunotherapy of Cancer, Biomed Central Ltd, London, UK, vol. 7, No. 1, Jan. 16, 2019 XP021270986 (13 pages).

N. Harder et al., "Automatic discovery of image-based signatures for ipilimumab response prediction in malignant melanoma", Scientific Reports, vol. 9, No. 1, May 15, 2019 XP055682034 (19 pages).

Y. Huang et al., "Macrophage spatial heterogeneity in gastric cancer defined by multiplex immunohistochemistry", Nature Communications, vol. 10, No. 1, Sep. 2, 2019 XP055681686 (15 pages).

X. Wang et al., "Prediction of recurrence in early stage non-small cell lung cancer using computer extracted nuclear features from digital H&E images", Scientific Reports, vol. 7, No. 1, Oct. 19, 2017 XP055681653 (10 pages).

Extended European search report (EESR) dated Apr. 14, 2020 by the European Patent Office in the European patent application EP19214264.4 that claims priority to this application (8 pages).

* cited by examiner

**TISSUE OF PATIENT STAINED WITH
VENTANA HER2/neu 4B5**

**OPTICAL DENSITY OF BROWN
DYE (DAB) LINKED TO HER2**

OUTPUT OF CONVOLUTIONAL NEURAL NETWORK ILLUSTRATING COMPONENTS OF FEATURE VECTORS

DETECTED CELL CENTERS IN EPITHELIUM REGIONS

| # | CNN_OUT1 | CNN_OUT2 | CNN_OUT3 | CNN_OUT4 | CNN_OUT5 | CNN_OUT6 | CNN_X | CNN_Y | PATIENT | CELL CLASS |
|---|---|---|---|---|---|---|---|---|---|---|
| 1 | 0 | 0 | 0 | 1 | 0.382875591152 | 0.372855141760 | 756 | 234 | 2 | B ● |
| 2 | 3.625 | 40.25 | 4.572916667 | 4 | 0.222468830252 | 0.222181179895 | 45 | 761 | 1 | B ● |
| 3 | 1.22222222222 | 20.1851851855 | 2.050388653004 | 5.196152422 | 0.433444627062 | 0.421852980036 | 142 | 751 | 1 | B ● |
| 4 | 1.690476190S | 7.619047619 | 2.902097902l | 6.480740659S4 | 0.505312330035 | 0.441613530138 | 385 | 919 | 1 | B ● |
| 5 | 7.15555555556 | 50.4 | 8.760465l163 | 6.708202303325 | 0.188801201389 | 0.144348630079 | 752 | 398 | 2 | B ● |
| 6 | 72.4482758862 | 103.15517241 | 92.372377622 | 7.615777310S9 | 3.120841409 | 3.080607127Sl | 315 | 631 | 5 | D ○ |
| 7 | 44.1111111111 | 46.2222222222 | 82.344871795 | 7.937253833 | 0.368368120836 | 0.489740717S8 | 304 | 344 | 3 | B ● |
| 8 | 77.5909909091 | 160.545454545 | 109.0982886 | 8.1240384046 | 2.4210230645 | 2.690863391 | 322 | 245 | 3 | D ○ |
| 9 | 87.6333852941 | 56.3088223529 | 85.3734604286 | 8.2462112512 | 0.534855567S9 | 0.442289430S2 | 764 | 929 | 1 | B ● |
| 10 | 67.4305555558 | 175.48811111 | 114.316666667 | 8.485281374l | 1.2453376040S | 1.645146046A29 | 209 | 271 | 5 | D ○ |
| 11 | 76.3291139241 | 162.620225316 | 121.46600971 | 8.888194417S | 1.7454416209 | 2.144747914l | 344 | 897 | 3 | D ○ |
| 12 | 83.625 | 160.025 | 145.536846154 | 8.944137191 | 1.0658214792 | 1.470648275S7 | 84 | 615 | 3 | D ○ |
| 13 | 83.7560977561 | 153.2195123 | 126.674107l4 | 9.055385l186l | 1.2773552971 | 1.609582234 | 144 | 720 | 3 | D ○ |
| 14 | 37.235294118 | 12.952941176 | 48.309027778 | 9.219544443S7 | 0.427404311SA | 0.298118399993 | 313 | 236 | 1 | B ● |
| 15 | 74.4482758862 | 162.609655S17 | 104.014703S88 | 9.327379053l | 0.589215475S8 | 0.614627l0035 | 724 | 337 | 3 | D ○ |
| 16 | 77.3358550S6 | 162.4831467 | 140.014747654 | 9.43198133l | 0.7178864684S | 1.118488308S | 824 | 16 | 3 | D ○ |
| 17 | 76.3888888889 | 151.17777778 | 114.281S25 | 9.468832980S | 0.64573934l893 | 0.844315311S7 | 629 | 547 | 5 | D ○ |
| 18 | 16.4134347A | 18.597816087 | 28.7479853A8 | 9.5916632466 | 0.50479001274 | 0.423105482A7 | 692 | 307 | 1 | B ● |
| 19 | 62.595744681 | 179.255321915 | 94.970486111 | 9.6096359714S | 0.726322862l7 | 0.80828807156 | 870 | 552 | 2 | D ○ |
| 20 | 73.2340A2553 | 151.468085511 | 100.100790051 | 9.695350571A9 | 1.13887242S2 | 0.97731067843 | 714 | 898 | 5 | D ○ |
| 21 | 76.4 | 158.231578895 | 121.592201389 | 9.746794342448 | 1.0994165144 | 1.803101975 | 312 | 477 | 3 | D ○ |
| 22 | 84.5104l6657 | 170.90625 | 113.608879Sl | 9.797958657l | 1.169308457l6 | 1.683688378S | 378 | 33 | 5 | D ○ |
| 23 | 68.890907216 | 170.2268844l2 | 117.6 | 9.848885780l8 | 1.628865257S7 | 1.94657805673 | 414 | 140 | 3 | D ○ |
| 24 | 75.134020619 | 165.773195888 | 128.368527AS | 9.848885780l9 | 2.0650802055l | 2.42016532646 | 418 | 258 | 5 | C ● |
| 25 | 46.7422680A1 | 114.701030593 | 129.787222222 | 9.848885780l8 | 0.486665683316 | 0.240633869907S | 4 | 216 | 3 | D ○ |
| 26 | 65.673489388 | 172.846938S78 | 132.510897l7S | 9.895494936S | 0.687215804478 | 1.351847038S | 110 | 128 | 5 | D ○ |
| 27 | 66.9593935S8 | 178.4648A646 | 132.SS5S56S7 | 9.94911l7437l1 | 1.2354221842 | 1.939535177l | 4 | 178 | 5 | B ● |
| 28 | 19.6372549902 | 81.0680622745l | 33.9111303361 | 10.0995049830 | 0.195175575758 | 0.196114812033 | 418 | 830 | 1 | B ● |
| 29 | 56.107843137 | 177.999019608 | 95.3822280892 | 10.0995049830 | 0.65333844Sl33 | 0.9899938A82 | 767 | 80 | 3 | D ○ |

FIG. 11

CLASSIFICATION OF A PATIENT'S CELLS USING A K-MEANS MODEL TRAINED ON ALL PATIENTS

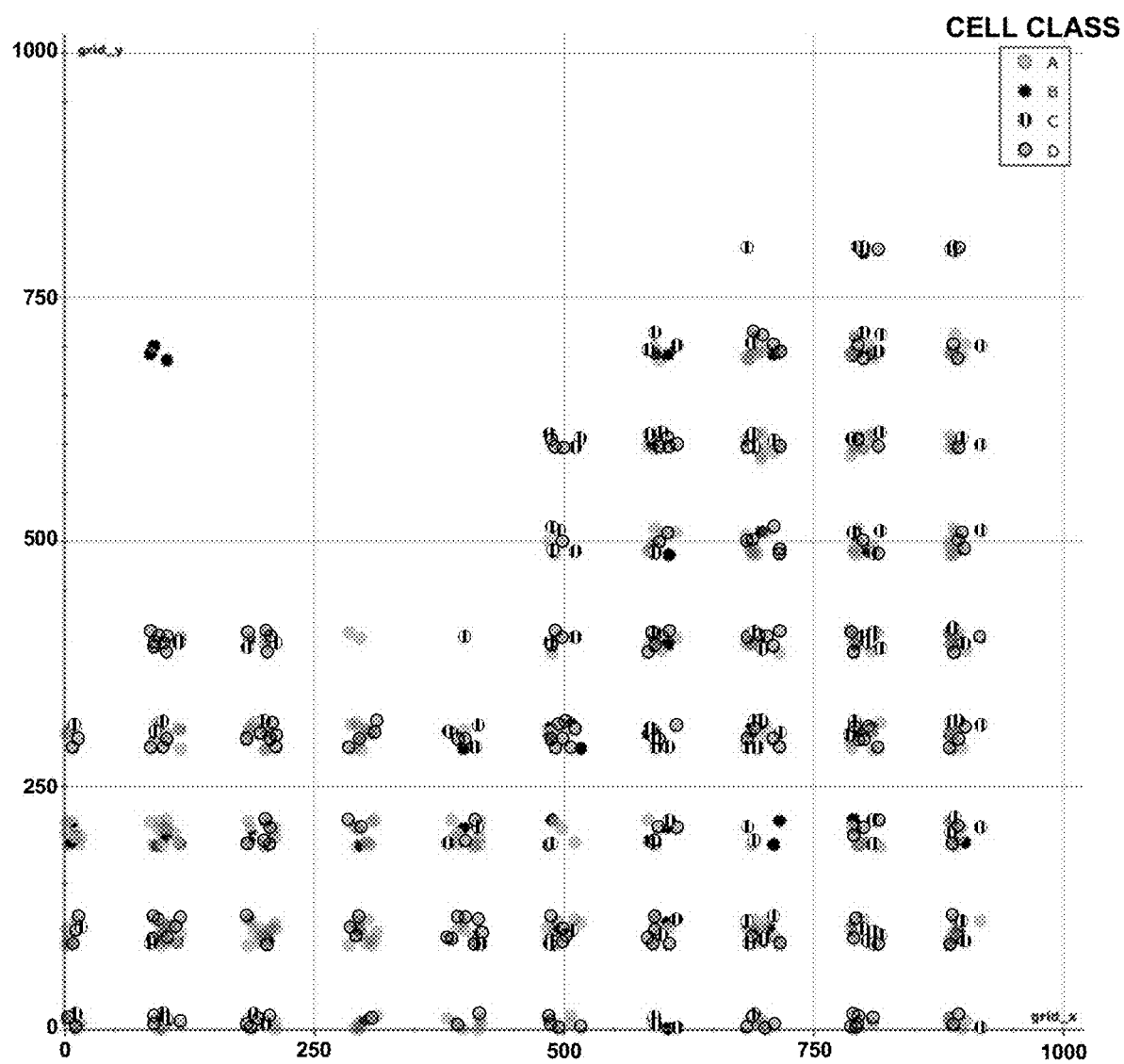
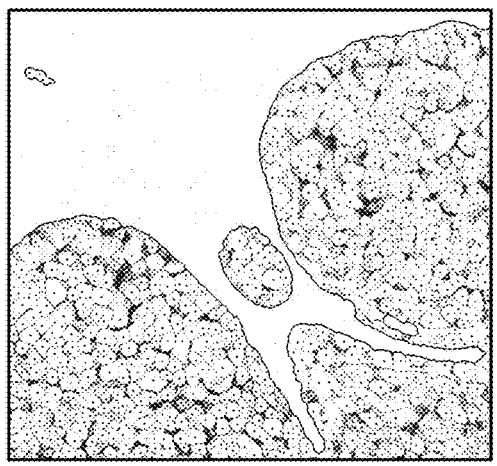
COLLECTING ALL CELLS WITHIN A GRID POINT USING RANDOM JITTER FOR VISUALIZATION
FIG. 14

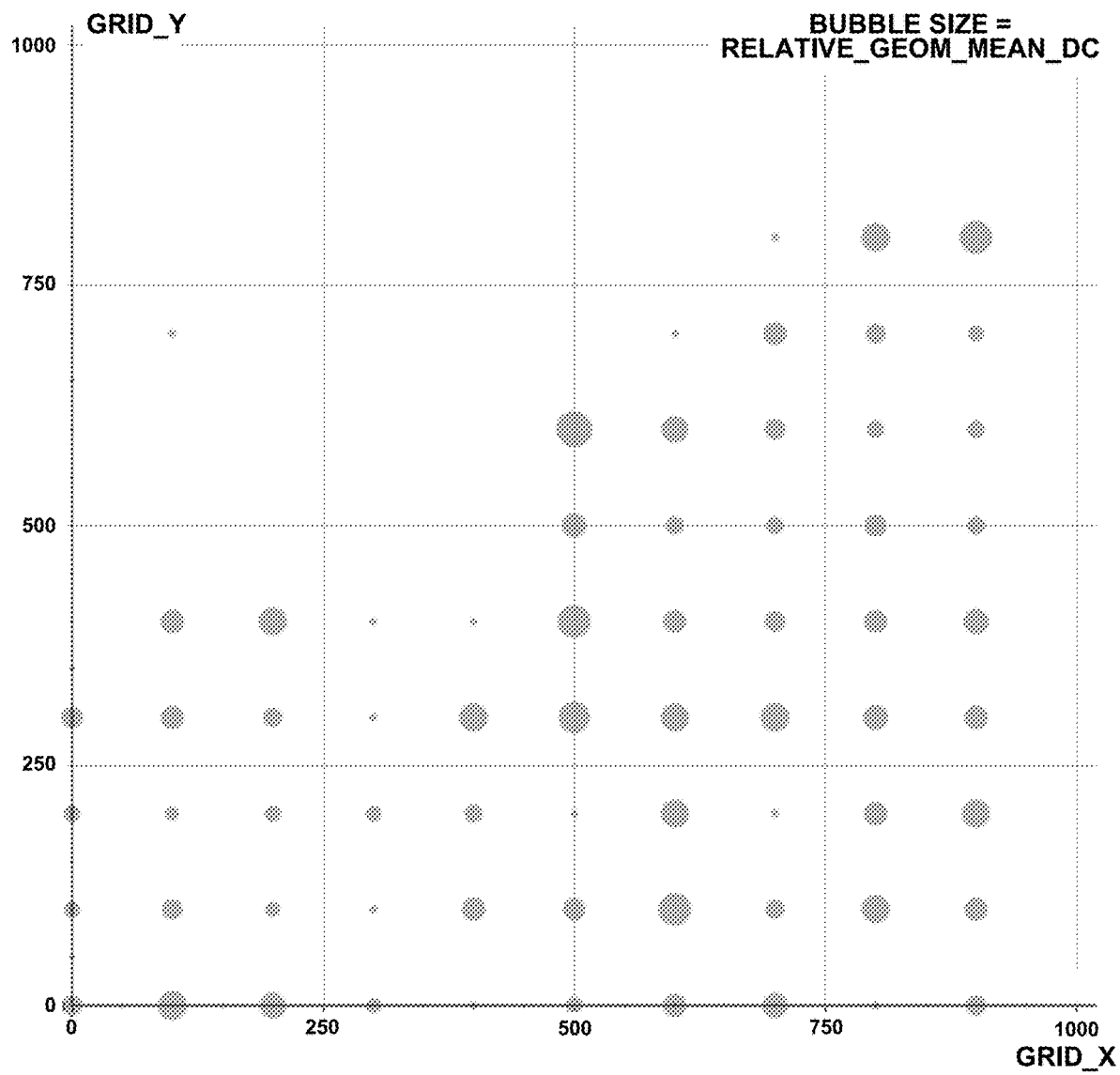
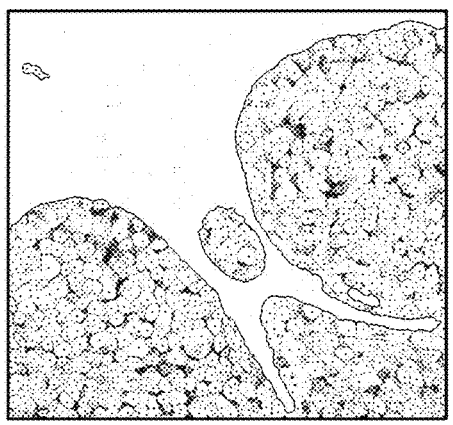
COLLECTING ALL CELLS WITHIN A GRID POINT USING BUBBLE SIZE TO INDICATE THE GEOMETRIC MEAN OF THE NUMBER OF CELLS PER GRID IN CELL CLASSES C AND D
FIG. 15

AVERAGE GEOMETRIC MEAN OF ALL GRID POINTS OF THE PATIENT IMAGE

| PATIENT | SCORE |
|---------|-------|
| P1 | 0 |
| P2 | 0.018371445806679 |
| P3 | 0.18867317404639 |
| P4 | 0.21767878042528 |
| P5 | 0.12066538018773 |

PATIENTS P1, P2 AND P5 DO NOT RESPOND TO PREDETERMINED THERAPY; PATIENTS P3 AND P4 DO RESPOND.

DEEP LEARNING METHOD FOR PREDICTING PATIENT RESPONSE TO A THERAPY

CROSS REFERENCE TO RELATED APPLICATIONS

This application is a continuation of, and claims priority under 35 U.S.C. § 120 from, nonprovisional U.S. patent application Ser. No. 16/705,238 entitled "A Deep Learning Method For Predicting Patient Response To A Therapy," now U.S. Pat. No. 11,348,231, filed on Dec. 6, 2019. Application Ser. No. 16/705,238, in turn, claims the benefit under 35 U.S. C. $119 of provisional application Ser. No. 62/776,443, entitled "Scoring Method for Identifying a Treatment for a Cancer Patient", filed on Dec. 6, 2018. This application incorporates by reference the entire contents of U.S. patent application Ser. No. 16/705,238 and 62/776,443.

TECHNICAL FIELD

The present invention relates to a method for computing a score indicative of how a cancer patient will respond to a predetermined therapy. Another aspect of the invention relates to a method for computing a score for a cancer patient indicative of a survival probability of the cancer patient.

BACKGROUND

Assessing a cancer patient's response probability to a given treatment is an essential step in determining a cancer patient's treatment regimen. Such an assessment is often based on histological analysis of tissue samples from a given patient and involves for example identifying and classifying cancers using standard grading schemes. Immunohistochemical (IHC) staining can be used to distinguish marker-positive cells that express a particular protein from marker-negative cells that do not express the protein. IHC staining typically involves multiple dyes, which includes one or more dyes connected to protein-specific antibodies and another dye that is a counterstain. A common counterstain is hematoxylin, which labels DNA and thus stains nuclei.

A protein specific stain or biomarker can be used to identify the regions of the tissue of the cancer patient that are likely to exhibit a response to a predetermined therapy. For example, a biomarker that stains epithelial cells can help to identify the suspected tumor regions. Then other protein specific biomarkers are used to characterize the cells within the cancerous tissue. The cells stained by a specific biomarker can be identified and quantified, and subsequently a score indicating the number of positively stained cells and negatively stained cells can be visually estimated by pathologists. This score can then be compared to scores of other cancer patients that have been calculated in the same way. If the response of these other patients to a given cancer treatment is known, the pathologist can predict, based on a comparison of the score calculated for the cancer patient with the scores of the other patients, how likely the cancer patient is to respond to a given treatment. However, visual assessment by pathologists is prone to variability and subjectivity.

Thus, a computer-based method is sought for generating a repeatable and objective score indicating a cancer patient's response to a given treatment.

SUMMARY

A method for indicating how a cancer patient will respond to a predetermined therapy relies on spatial statistical analysis of classes of cell centers present in a digital image of tissue of the cancer patient. The cell centers are detected in the digital image of stained tissue of the cancer patient. For each cell center, an image patch that includes the cell center is extracted from the digital image. A feature vector is generated based on each image patch using a convolutional neural network. A class is assigned to each cell center based on the feature vector associated with each cell center. A score is then computed for the digital image of tissue by performing spatial statistical analysis on the classes of the cell centers. The score is indicative of how the cancer patient will respond to the predetermined therapy. The predetermined therapy is recommended to the cancer patient if the score is larger than a predetermined threshold.

The disclosed method uses a convolutional neural network to generate a feature vector of an image patch including a cell center extracted from a digital image of tissue of a cancer patient. The tissue has been stained. For example, tissue has been stained with a stain that stains cellular nuclei or the tissue has been stained to mark membranes.

In a first step, cell centers are detected on a digital image of tissue of a cancer patient, wherein the tissue has been stained. In a second step, for each cell center, an image patch that includes the cell center is extracted. Subsequently, in a third step, for each cell center a feature vector is generated based on each image patch using a convolutional neural network. Based on the feature vector associated with each cell center, in a fourth step a class is assigned to each cell center and in a fifth step, a score for the digital image of tissue is computed by performing spatial statistical analysis on the classes of the cell centers, wherein the score is indicative of how the cancer patient will respond to a predetermined therapy.

According to an embodiment of the disclosed method, the spatial statistical analysis performed on the classes of the cell centers generates a profile for the digital image, and the score for the cancer patient is computed by comparing the profile for the digital image of the cancer patient with profiles generated from images of tissue from a plurality of patients whose responses to the predetermined therapy are known. In an embodiment of the method, the profile is generated by counting how many cell centers are assigned to each of the classes of cell centers present in the image. In an alternative embodiment of the invention, the profile is generated based on a spatial distribution of cell centers assigned to various classes in the digital image.

Another embodiment of the method includes defining the classes of the cell centers using k-means clustering of feature vectors of cell centers detected in a plurality of digital images of tissue from a plurality of cancer patients.

According to another embodiment of the method, the convolutional neural network is a convolutional neural network selected from the group consisting of: a generative adversarial network (GAN), an information maximizing generative adversarial network (infoGAN), a boundary equilibrium generative adversarial network (BeGAN), and an autoencoder convolutional neural network.

According to yet another embodiment of the disclosed method, the convolutional neural network is a discriminator part of an infoGAN, and the classes of the cell centers are defined by performing an arg-max operation on output values of predefined network nodes of the convolutional neural network. Performing the arg-max operation involves determining the input value of each predefined network node that yields the maximum output value of the predefined network node. For a generator with four neurons in the predictor layer that represent four classes (e.g., A-D), a given cell center is classified in the class corresponding to the neuron having the largest activation value.

In another embodiment of the method, the spatial statistical analysis involves calculating a number of cells that have been assigned to a first class that are within a predefined maximum distance of cells that have been assigned to a second class.

In an embodiment of the method, extracting the image patch involves extracting a first image patch that includes the cell center and then extracting a second image patch that is smaller than the first image patch and centered on the same cell center.

In another embodiment of the method, the feature vector is generated based on an image patch using a convolutional neural network. The image patch is generated by stacking a first image patch and a second image patch. The first image patch is centered on a cell center, and the second image patch is generated by downscaling a third larger image patch to the size of the first image patch, wherein the third image patch is also centered on the cell center. The size of the third image patch is larger than the size of the first image patch.

In another embodiment of the method, the feature vector is generated based on an image patch using a convolutional neural network. The image patch is generated from a first image patch that includes a cell center. The method of generating the image patch is selected from the group consisting of: color space transformation, two dimensional Fourier transformation, Fourier-Bessel rotational invariant transformation, and Fourier Mellin Transform.

Another aspect of the disclosure concerns a method for computing a score for a cancer patient indicating a survival probability of the cancer patient. In a first step of the method, cell centers on a digital image of tissue of the cancer patient are detected, wherein the tissue has been stained, for example the tissue has been immunohistochemically stained to mark membranes or has been stained to mark cell nuclei. In a second step, each cell center is classified by extracting an image patch that includes the cell center. Subsequently, in a third step, image analysis is performed on each image patch using a convolutional neural network to generate a feature vector based on each image patch using the convolutional neural network. The feature vectors are then used to classify the cell centers. Then a profile is generated by spatial statistical analysis of the classified cell centers. Subsequently a score for the cancer patient is computed by comparing the profile to those of other patients to indicate a survival probability of the cancer patient. The profile is compared to existing profiles of patients whose survival probability is known.

In an embodiment of the method, the survival probability of the cancer patient is indicated. A profile is generated by classifying each feature vector using a database of Nc cluster analysis models. Alternatively, the step of generating the profile is performed based on how many cell centers are classified as belonging to a class. The convolutional neural network is a convolutional neural network selected from the group consisting of: a generative adversarial network (GAN), an information maximizing generative adversarial network (infoGAN), a boundary equilibrium generative adversarial network (BeGAN), and an autoencoder convolutional neural network.

In an embodiment of the method, extracting the image patch involves extracting a first image patch that includes the cell center and then extracting a second image patch that is larger than the first image patch and has a common center pixel with the first image patch. The spatial statistical analysis indicates a spatial distribution in the digital image of cell centers that have similar feature vectors. The profile is generated based on a spatial distribution in the digital image of feature vectors that share a common feature compared to other feature vectors that do not share the common feature.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 11 shows an example of k-means cluster analysis performed for four patients to generate patient profiles.

FIG. 14 shows a random jitter graph used to visualize the distribution of cell centers classified into specific classes or profiles within a defined area of the digital image of the stained tissue.

FIG. 15 shows a quantification graph used to visualize the number of cell centers classified into a specific class within a defined area of the digital image of the stained tissue. The size of each bubble in the graph corresponds to the geometric mean of the number of cells in two specified classes.

DETAILED DESCRIPTION

Reference will now be made in detail to some embodiments of the invention, examples of which are illustrated in the accompanying drawings.

Figure 1:
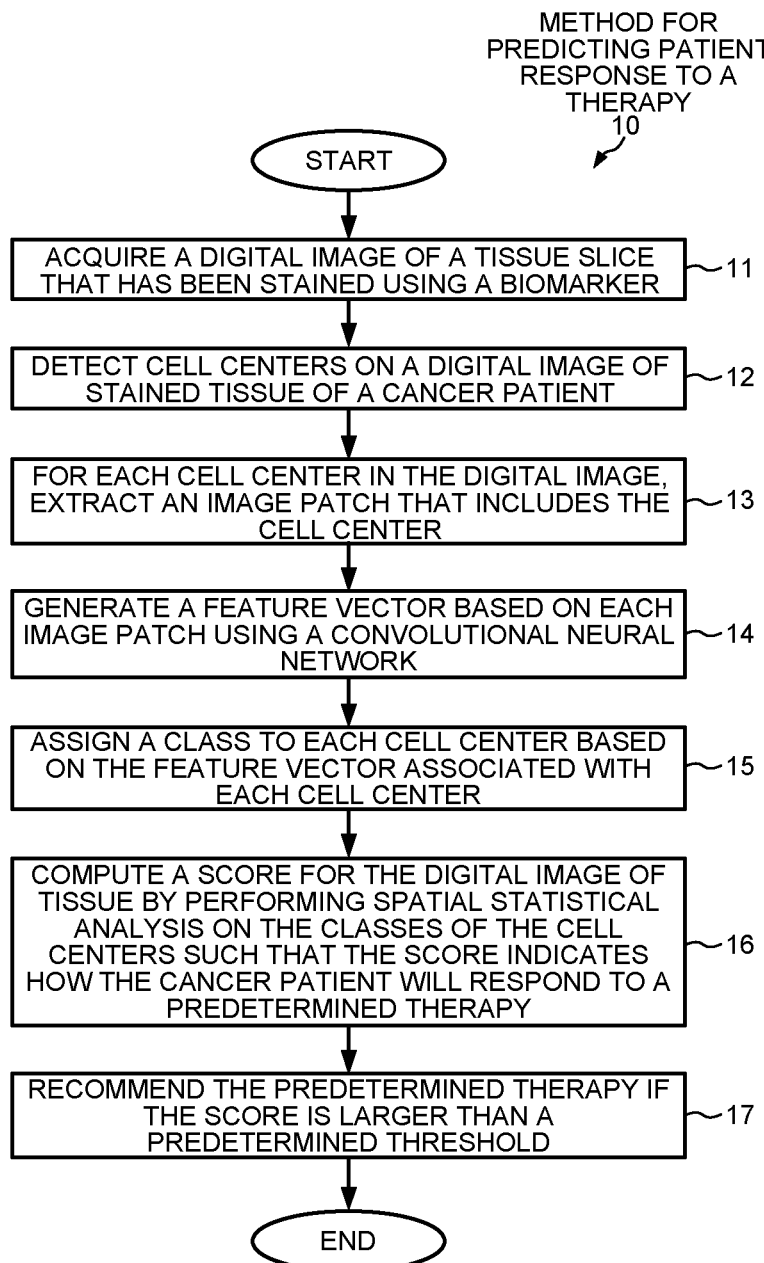
FIG. 1 is a flowchart of steps by which an analysis system analyzes digital images of tissue from a cancer patient and predicts how the cancer patient will likely respond to a predetermined therapy.

FIG. 1 is a flowchart of steps 11-17 of a method 10 by which an analysis system analyzes a digital image of tissue from a cancer patient and predicts how the cancer patient will likely respond to a predetermined therapy. In a first step 11, a high-resolution digital image is acquired of a tissue slice from the cancer patient that has been stained using one or more biomarkers or stains.

In step 12, cell centers are detected in the digital image of stained tissue of the cancer patient. In step 13, for each cell center in the digital image, an image patch is extracted that includes the cell center. In step 14, a feature vector is generated based on each image patch using a convolutional neural network. In step 15, a class is assigned to each cell center based on the feature vector associated with the cell center. In step 16, a score is computed for the digital image of tissue by performing spatial statistical analysis on the classes of the cell centers that are present in the digital image. The score is indicative of how the cancer patient will respond to a predetermined therapy. The spatial statistical analysis that is performed on the classes of cell centers generates a profile for the digital image. The score for the cancer patient is computed by comparing the profile for the digital image of the cancer patient with profiles generated from images of tissue from a plurality of other cancer patients whose responses to the predetermined therapy are known. In step 17, the predetermined therapy is recommended if the score is larger than a predetermined threshold.

Figure 2:
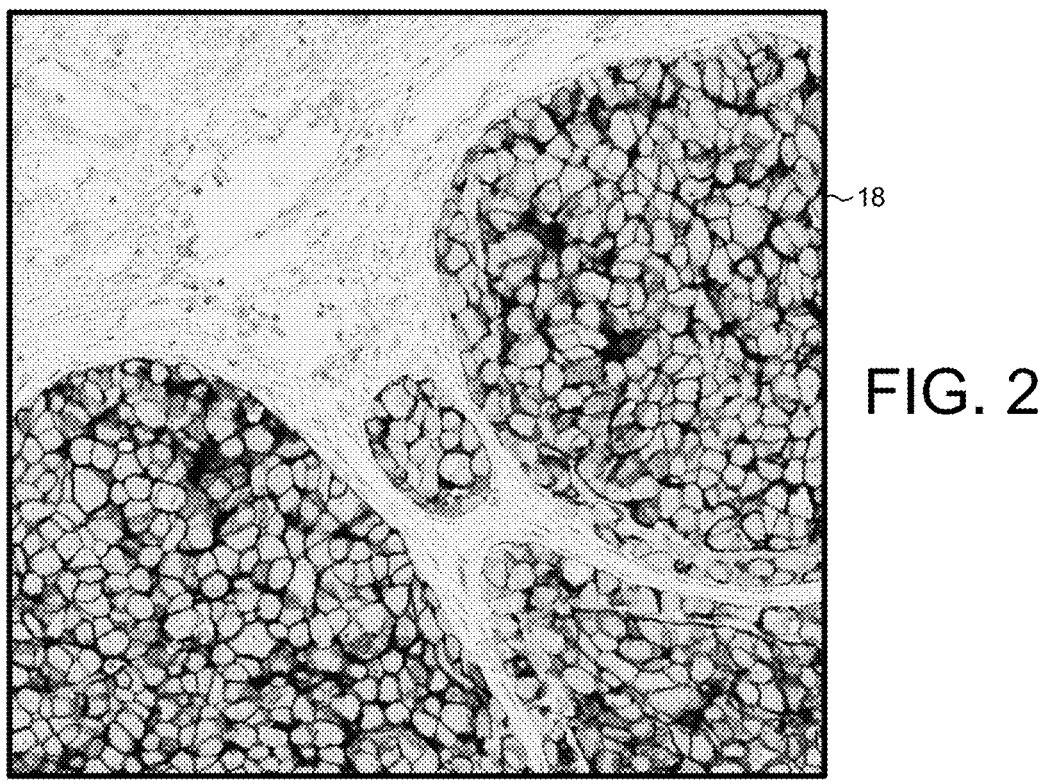
FIG. 2 is an image of tissue of a cancer patient that has been stained.

FIG. 2 is a digital image 18 of stained tissue that has been acquired in step 11. Image 18 shows tissue from a cancer patient that has been immunohistochemically stained with an anti-Her2/neu antibody. The anti-Her2/neu antibody binds to the membrane protein Her2/neu so that with a subsequent 3,3'-Diaminobenzidine (DAB) staining step the location of the protein Her2/neu in the tissue sample is visualized. In another embodiment, the tissue has been immunohistochemically stained using hematoxylin and eosin. In yet other embodiments, the tissue has been stained using an antibody specific to a selected protein, such as HER1, HER2, HER3, K167, PD-L1, PD-L2, CD3, CD4, CD8, CD20 or CD73.

Figure 3:
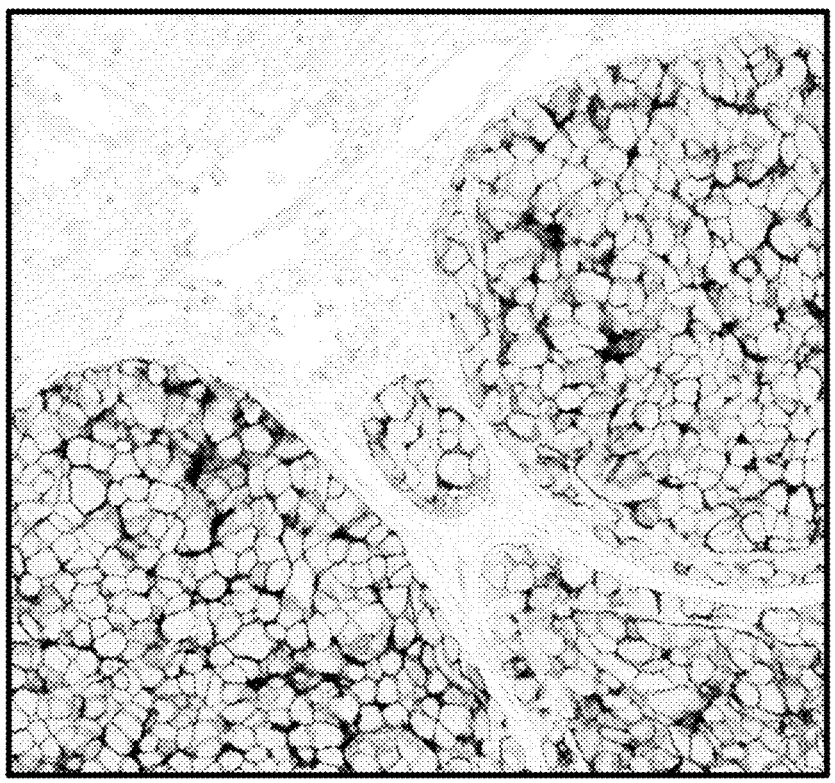
FIG. 3 is an image showing the optical density of the stain in FIG. 2.

FIG. 3 is an image showing the optical density distribution of the DAB staining of the image of FIG. 2. Areas of intense DAB staining are dark in FIG. 3. Cell membranes are also apparent in FIG. 3.

FIGS. 4-8 illustrate the image analysis performed on the image of FIG. 2 in step 12 in order to detect cell centers in the image. The image analysis of the image of FIG. 2 was performed by a convolutional neural network. The image of FIG. 4 has been segmented to show cell membranes, cell nuclei and cell centers within epithelial cells. Regions of non-epithelial cells appear as white in FIG. 4.

Figure 4:
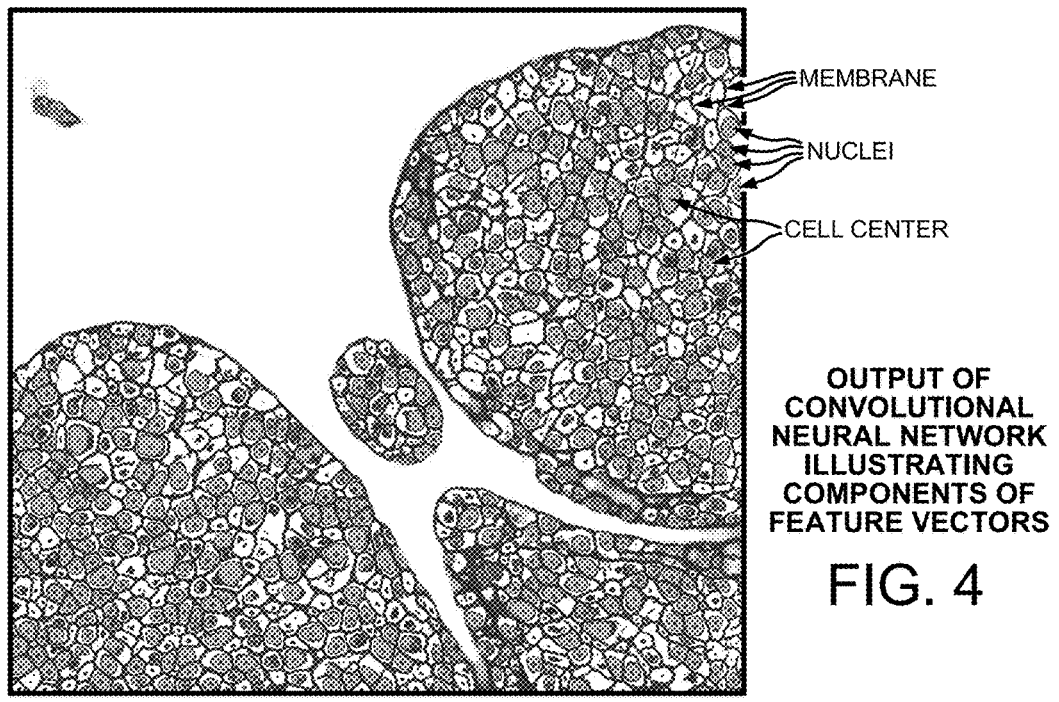
FIG. 4 illustrates an example of image analysis performed on the image of FIG. 2 by a convolutional neural network.
Figure 5:
FIG. 5 is a segmented image showing epithelium in gray and non-epithelial tissue in white.

FIG. 5 is a segmented image of the tissue of FIG. 4 showing only epithelium as gray and non-epithelial tissue as white. The image shown in FIG. 5 represents the output of an image analysis step in which epithelial and non-epithelial cells are identified. The image shown in FIG. 5 represents one layer of information contained in the image of FIG. 4.

Figure 6:
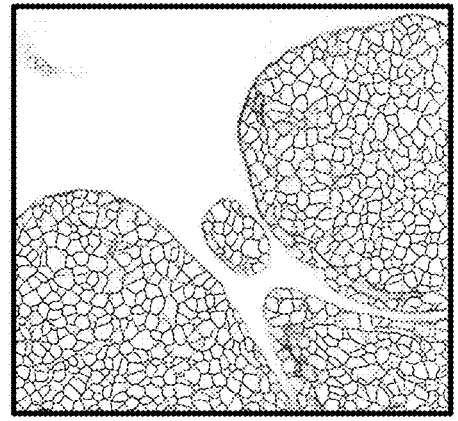
FIG. 6 is a segmented image showing cell membranes.

FIG. 6 is a segmented image showing cell membranes. Tissue other than the membranes appears as white. The image shown in FIG. 6 represents the output of another analysis step in which cell membranes are identified and distinguished from other tissue. The image of FIG. 6 represents one layer of information contained in the image of FIG. 4.

Figure 7:
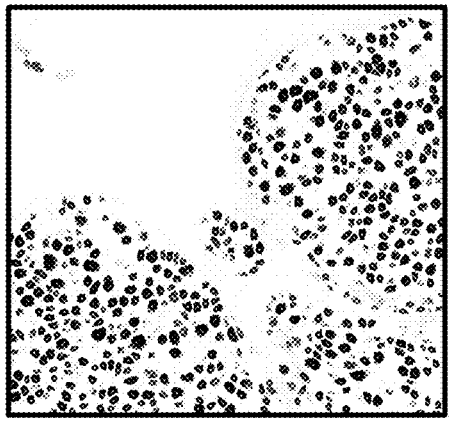
FIG. 7 is a segmented image showing cell nuclei.

FIG. 7 is a segmented image showing cell nuclei; other tissue appears as white. The image of FIG. 7 represents the output of another analysis step in which cell nuclei are identified and distinguished from other tissue. The image of FIG. 7 represents one layer of information contained in the image of FIG. 4.

Figure 8:
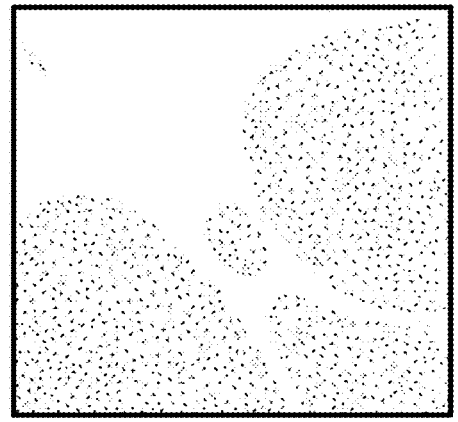
FIG. 8 is a segmented image showing cell centers.

FIG. 8 is a segmented image showing cell centers; other tissue appears as white. The image of FIG. 8 represents the output of analysis step 12 in which cell centers are identified. In one embodiment of the method for indicating how a cancer patient will respond to a predetermined therapy, the cell centers are defined as the center of the area that has been identified as being the nucleus of a cell. In another embodiment, the cell centers are defined as the center of the area that has been identified as the area surrounded by a continuous membrane. The image of FIG. 8 represents one layer of information contained in the image of FIG. 4.

Figure 9:
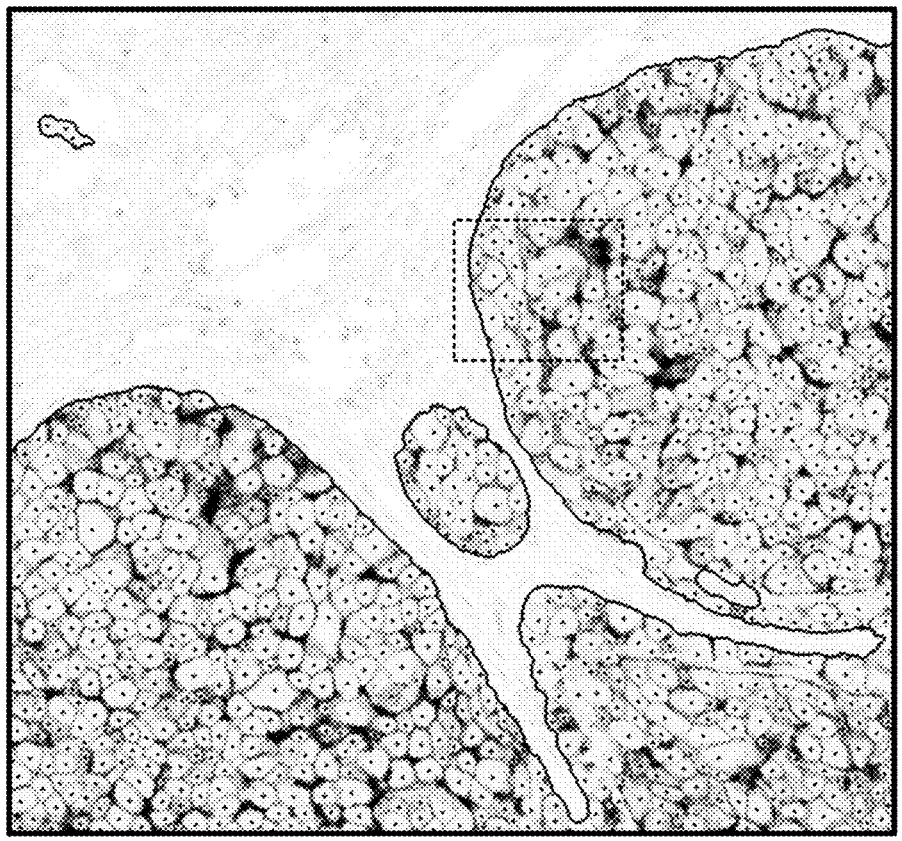
FIG. 9 is the same image as FIG. 4 without the nuclei being marked.

FIG. 9 shows the segmented image of FIG. 4 superimposed on the image of the stained tissue. Cell centers have been identified in the regions corresponding to epithelial cells.

Figure 10:
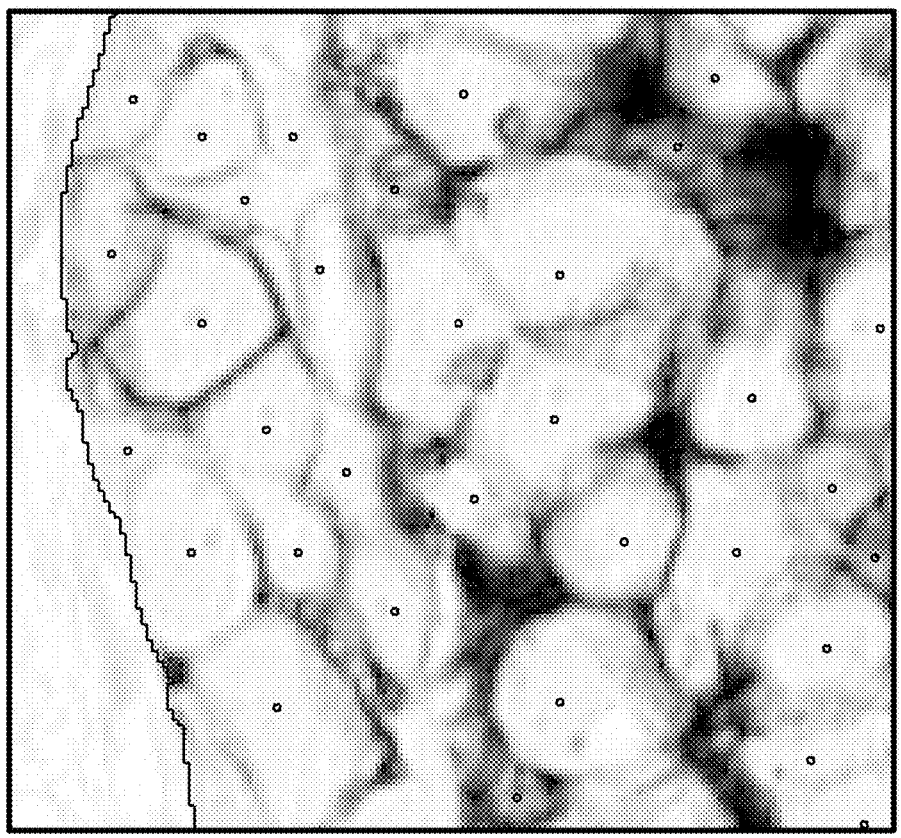
FIG. 10 is a more detailed view of the region in FIG. 9 enclosed by the dashed rectangle.

FIG. 10 is a more detailed view of the region in FIG. 9 enclosed by the dashed rectangle. In FIG. 9, the cell centers are defined as the center of each area in the image that has been identified as being surrounded by a continuous membrane. In FIG. 10, the membrane is dark, and the area within the membrane is light.

In step 13 of the method for indicating how a particular cancer patient will respond to a predetermined therapy, an image patch surrounding each cell center is extracted from the stained image of FIG. 2. In one embodiment, multiscale patches are used in which the patch is generated by superimposing multiple patches of different resolutions over one another. For example, a multiscale patch can be generated by combining a patch having a resolution of 64 μm×64 μm with another patch having a resolution of 16 μm×16 μm.

In step 14, a convolutional neural network is used to generate a feature vector for each cell center by analyzing the associated multiscale patch. Thus, the features from the stained image at multiple resolutions are aggregated into an unsupervised feature vector.

In step 15, a class is assigned to each cell center based on the feature vector associated with that cell center. The classes are determined using cluster analysis models, such as k-means cluster analysis, to cluster the feature vectors of many cell centers from images of tissue from many cancer patients.

FIG. 11 shows an example of the clustering calculations of step 15 used to determine four classes of cells (A, B, C, D) using images of stained tissue from only five cancer patients. In an actual implementation, the cluster analysis should be trained on images of many more than just five cancer patients. The four classes of cell centers (A-D) are defined using the feature vector output by the convolutional neural network for each cell center as listed in the table in FIG. 11. FIG. 11 shows only the data for the first twenty nine of the cell centers from the five patients. Each feature vector has six components: cnn_out1, cnn_out2, . . . , cnn_out6. FIG. 11 lists the six components of the feature vector for the first twenty nine cell centers. The second-to-last column lists the patient associated with the numbered cell center. For example, as shown in line 3 of the table in FIG. 11, the cell center #3 of patient 1 (patient_id p1) has a feature vector with the six components (1.2222222222, 20.185185185, 2.0503663004, 5.1961524227, 0.43344627062, 0.42155290038) and has been classified by k-means clustering into class B (cell_classification).

Figure 12:
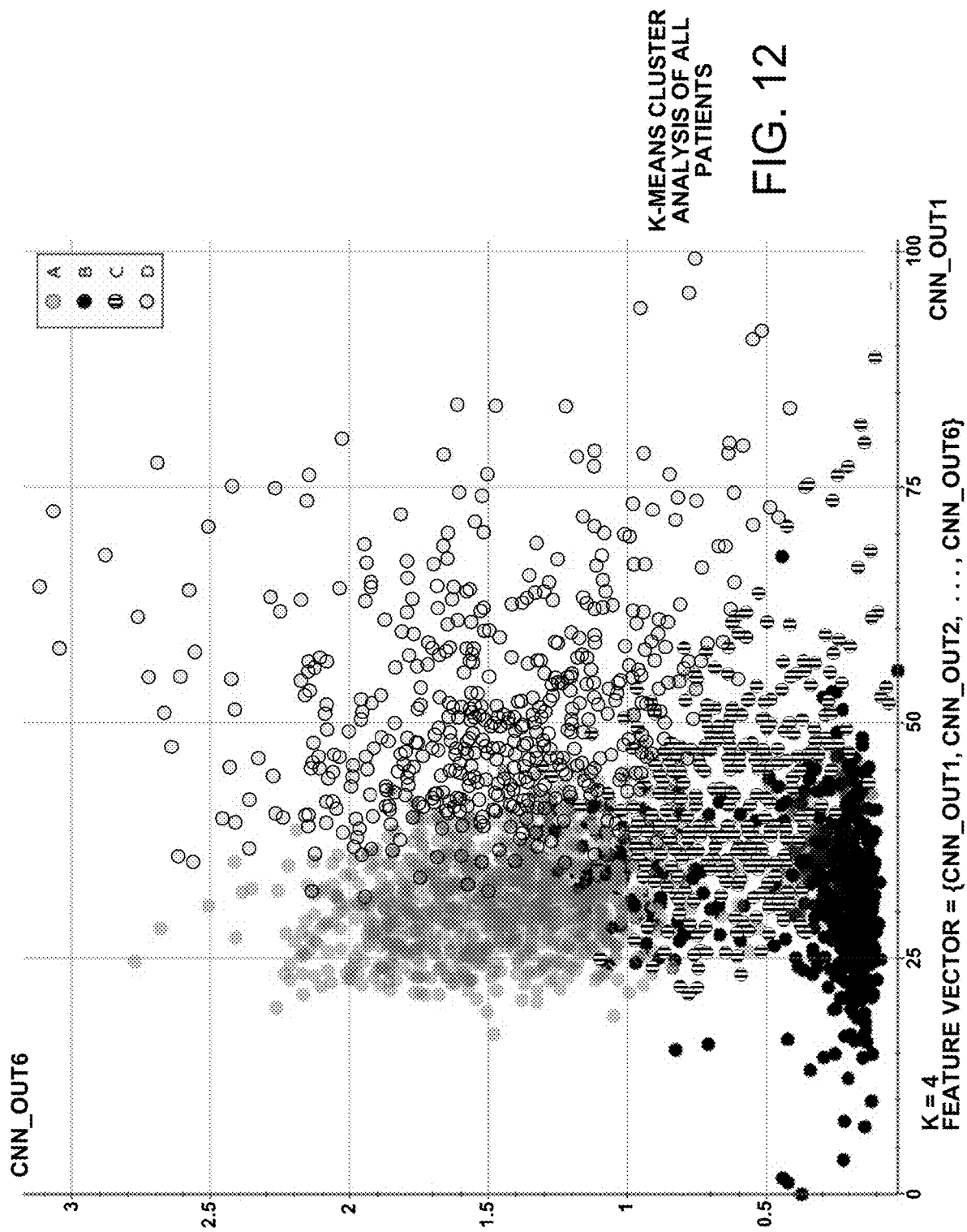
FIG. 12 is a plot illustrating cluster analysis in which the stained cells of four patients are classified into one of four classes.

FIG. 12 is a plot illustrating the k-means cluster analysis in which the cell centers of the five patients have been classified into one of four classes (A-D). For example, the black dots represent cell centers in class B, and the open circles represent cell centers in class D.

Using the cell center classifications obtained from cluster analysis, a class is assigned to each cell center in the stained image of the cancer patient based on the feature vector associated with that cell center. Consequently, each epithelial cell of the stained tissue of the cancer patient is classified as described above.

Figure 13:
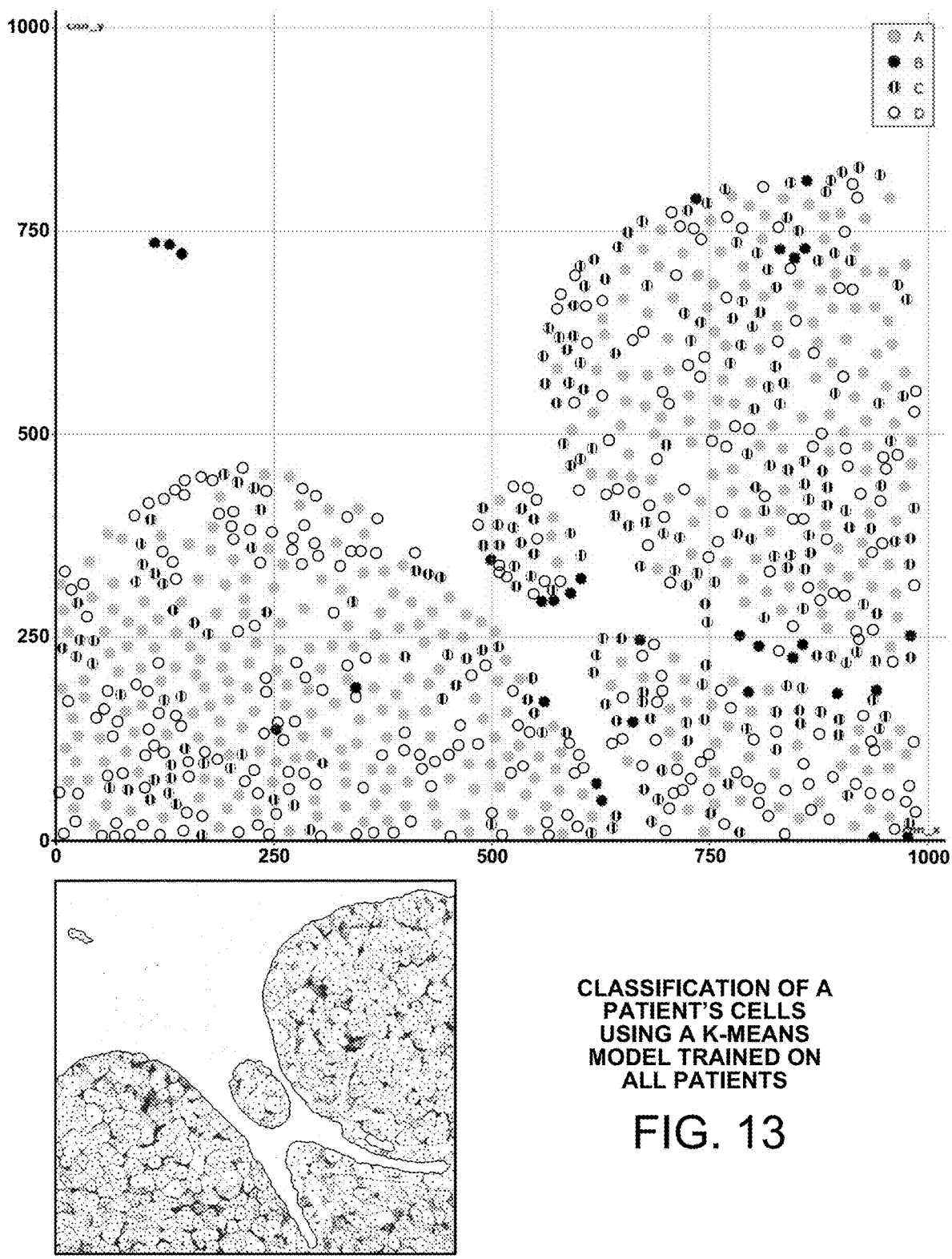
FIG. 13 is shows a plot in which each cell of stained tissue of a specific patient is classified into one of four classes corresponding to the generated patient profiles.

FIG. 13 illustrates how each epithelial cell of the stained tissue of the digital image of FIG. 2 is classified into one of the four classes A, B, C and D defined using k-means clustering. In FIG. 13, the gray dots represent cells in class A, the black dots represent cells in class B, the striped dots represent cells in class C, and the circles represent cells in class D.

In step 16 of the method for indicating how a particular cancer patient will respond to a predetermined therapy, a score is computed for the digital image 18 of tissue from the cancer patient by performing spatial statistical analysis on the classes of the cell centers. The spatial statistical analysis is used to generate a profile for the digital image 18. The score for the cancer patient is then computed by comparing the profile for the digital image of the cancer patient with profiles generated from images of tissue from many other patients whose responses to the predetermined therapy are known.

Figures 16, 17:
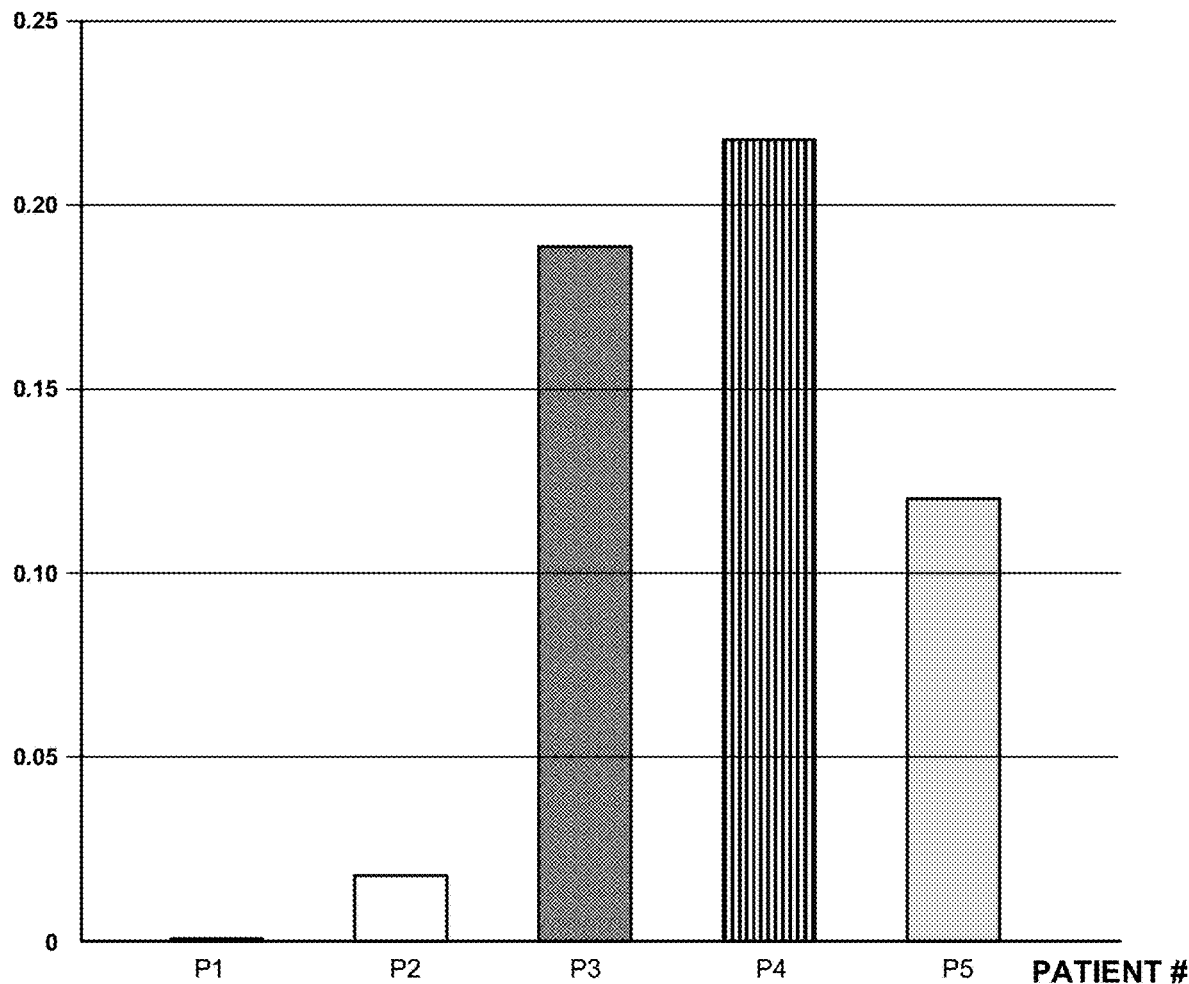
FIG. 16 shows a graph of scores indicating a patient's response to a given treatment for five patients.
FIG. 17 is a table listing the numerical values of the scores depicted in the graph of FIG. 16.

One way to generate the profile for the digital image is simply to count how many cell centers are assigned to each of the classes of cell centers. Another way to generate the profile for the digital image is based on the spatial distribution of the classified cell centers in the digital image. For this example, the profile is defined by how many cell centers are assigned to a first class for which at least a predefined number of cell centers that are assigned to a second class are located closer than a predefined distance to the cell centers assigned to the first class. FIGS. 14-16 illustrate alternative ways to generate a profile from a digital image of cancer tissue that can be used to indicate how the cancer patient will respond to a predetermined therapy.

FIG. 14 shows a random jitter scatter plot used to visualize the distribution of cell centers classified into classes A-D within a defined area of a grid overlaying the digital image of FIG. 13. As shown in FIG. 14, within each grid area cell centers falling within this area are grouped with adjacent cell centers. In the example of FIG. 14, per grid area, four subgroups within the grid area are formed in addition to another five subgroups on the border to the adjacent grid areas. The four classes are designated by dots in FIG. 14 in the same manner as illustrated in FIG. 13 (gray, black, striped, circle). Cells classified in the same class within a grid area are counted. For example, the grid area in the upper right corner of FIG. 14 contains one cell center in class A, no cell centers in class B, three cell centers in class C, and two cell centers in class D. The scatter plot of FIG. 14 allows the predominant class of cell present within a grid area to be easily recognize.

FIG. 15 shows a quantification graph used to visualize the number of cell centers classified to a group within each grid area. The sizes of the bubbles in the graph correspond to the geometric mean of the number of cells classified to specific class. In the example of FIG. 15, the bubble size corresponds to the geometric mean of the number of cell centers in a given area that have been classified into only classes C and D. A bubble with a larger diameter indicates a larger average number of cells in classes C and D in the area surrounding the bubble. For each patient, spatial statistical analysis as shown in the examples of FIGS. 14-15 is carried out to determine a score indicative of the patient's response to treatment.

FIG. 16 shows an example of a score that is calculated to indicate a patient's response to a particular treatment. In this example, the score is the mean value of the geometric mean of the number of cell centers classified in classes C and D per grid area of the digital image of tissue of the patient.

In the example of FIG. 16, the predictive accuracy of the score was trained on only five patients whose responses to the predetermined therapy are known. In an actual implementation, the predictive accuracy of the score should be trained on images of many more than just five cancer patients whose outcome after administering the therapy is known. In the example of FIG. 16, the digital image of tissue from patient 4 (P4) generated an average geometric mean of the number of cell centers in classes C and D per grid area of 0.21767878042528. For patient 3 (P3) the average geometric mean of the number of cell centers in classes C and D per grid area was 0.18867317404639. For patient 5 (P5) the average geometric mean was 0.12066538018773.

FIG. 17 provides an overview of the data shown in the chart of FIG. 16. It is known that patients 3 and 4 responded to the predetermined therapy, whereas patients 1, 2 and 5 did not respond to the predetermined therapy. Therefore, the average geometric mean of the number of cell centers in classes C and D per grid area can be used as a score to indicate how the particular cancer patient with the stained tissue of FIG. 2 will respond to the predetermined therapy. For the cancer patient with the stained tissue of FIG. 2, which resulted in the spatial statistical analysis illustrated in FIG. 15, the average geometric mean of the number of cell centers in classes C and D per grid area was 0.19. This score of 0.19 indicates that the cancer patient will probably respond to the predetermined therapy because 0.19 is similar to the score of patient 3 of 0.189 and the score of patient 4 of 0.218, both of which responded to the therapy.

In step 17 of the method, the predetermined therapy is recommended to the cancer patient if the score is larger than a predetermined threshold, such as 0.175, for example.

In another embodiment of the method for indicating how a particular cancer patient will respond to a predetermined therapy, the convolutional neural network is a discriminator part of an information maximizing generative adversarial network (infoGAN), and the classes of the cell centers are defined by performing an arg-max operation on output values of predefined network nodes of the convolutional neural network. Performing the arg-max operation involves determining the input value (argument) of each predefined network node that gives rise to a maximum output value of the predefined network node. For example, if a generator has four neurons (network nodes) in the predictor layer representing four classes, a given cell center is classified in the class corresponding to the neuron having the largest activation value. The four neurons (e.g., N1-N4) in the predictor layer of the generator represent the four classes A-D. For example, the inputs for an exemplary cell center generate the activation values 0.1, 0.2, 0.15 and 0.01 in neurons N1-N4, respectively. The maximum activation value is 0.2 in neuron N2, which represents class B. Thus, the exemplary cell center is classified in class B.

Although the present invention has been described in connection with certain specific embodiments for instructional purposes, the present invention is not limited thereto. Various modifications, adaptations, and combinations of various features of the described embodiments can be practiced without departing from the scope of the invention as set forth in the claims.

What is claimed is:

1. A method comprising:
  detecting cell centers on a digital image of tissue of a cancer patient, wherein the tissue has been stained;

for each cell center, extracting an image patch that includes the cell center;
generating a feature vector based on each image patch using a convolutional neural network;
assigning a class to each cell center based on the feature vector associated with each image patch that includes the cell center; and
computing a score for the digital image of tissue based on how the cell centers assigned to each of the classes of cell centers are spatially distributed in the digital image and based on how many cell centers assigned to a first class are located closer than a predetermined distance to a predetermined number of cell centers assigned to a second class, wherein the score is indicative of how the cancer patient will respond to a predetermined therapy.

2. The method of claim 1, further comprising:
recommending the predetermined therapy if the score is larger than a predetermined threshold.

3. The method of claim 1, wherein the score is indicative of a survival probability of the cancer patient after receiving the predetermined therapy.

4. The method of claim 1, further comprising:
determining how the cell centers assigned to each of the classes of cell centers are spatially distributed in the digital image by counting how many cell centers are assigned to each of the classes of cell centers.

5. The method of claim 1, wherein the score for the digital image of tissue of the cancer patient is computed by comparing how the cell centers assigned to each of the classes of cell centers are spatially distributed in the digital image of tissue of the cancer patient to how cell centers of classes of cell centers are spatially distributed in digital images of tissue from a plurality of cancer patients whose responses to the predetermined therapy are known.

6. The method of claim 1, wherein the classes of the cell centers are defined using k-means clustering of feature vectors of cell centers detected in a plurality of digital images of tissue from a plurality of cancer patients.

7. The method of claim 1, wherein the convolutional neural network is a discriminator part of an information maximizing generative adversarial network (infoGAN), and wherein the classes of the cell centers are defined by performing an arg-max operation on output values of pre-defined network nodes of the convolutional neural network.

8. The method of claim 1, wherein the convolutional neural network is a convolutional neural network selected from the group consisting of: a generative adversarial network (GAN), an information maximizing generative adversarial network (infoGAN), a boundary equilibrium generative adversarial network (BeGAN), and an autoencoder convolutional neural network.

9. The method of claim 1, wherein the tissue has been stained with a stain that stains cellular nuclei.

10. The method of claim 1, wherein the tissue has been stained using an antibody specific to a protein selected from the group consisting of: HER1, HER2, HER3, KI67, PD L1, PD-L2, CD3, CD4, CD8, CD20, and CD73.

11. The method of claim 1, wherein the tissue has been immunohistochemically stained using hematoxylin and eosin.

12. The method of claim 1, wherein the extracting the image patch involves extracting a first image patch that includes the cell center and then extracting a second image patch that is smaller than the first image patch and centered on the cell center.

13. A method comprising:
detecting cell centers on a digital image of tissue of a cancer patient, wherein the tissue has been stained;
for each cell center, extracting an image patch that includes the cell center;
generating a feature vector based on each image patch using a convolutional neural network;
assigning a class to each cell center based on the feature vector associated with each image patch that includes the cell center; and
computing a score for the digital image of tissue based on how the cell centers assigned to each of the classes of cell centers are spatially distributed in the digital image and based on how many cell centers assigned to a first class are located closer than a predetermined distance to a predetermined number of cell centers assigned to a second class, wherein the score is indicative of a survival probability of the cancer patient.

14. The method of claim 13, wherein the score for the digital image of tissue of the cancer patient is computed by comparing how the cell centers assigned to each of the classes of cell centers are spatially distributed in the digital image of tissue of the cancer patient to how cell centers of classes of cell centers are spatially distributed in digital images of tissue from a plurality of cancer patients whose survival probabilities are known.

15. The method of claim 13, further comprising:
wherein determining how the cell centers assigned to each of the classes of cell centers are spatially distributed in the digital image is based on how many feature vectors are classified as belonging to a class of cell centers.

16. The method of claim 13, wherein the convolutional neural network is a convolutional neural network selected from the group consisting of: a generative adversarial network (GAN), an information maximizing generative adversarial network (infoGAN), a boundary equilibrium generative adversarial network (BeGAN), and an autoencoder convolutional neural network.

17. The method of claim 13, wherein the tissue has been immunohistochemically stained to mark membranes.

18. The method of claim 13, wherein the extracting the image patch involves extracting a first image patch that includes the cell center and then extracting a second image patch that is larger than the first image patch and has a common center pixel with the first image patch.

19. The method of claim 13, further comprising:
determining how the cell centers assigned to each of the classes of cell centers are spatially distributed in the digital image by determining how cell centers having similar feature vectors are spatially distributed in the digital image.

20. The method of claim 13, wherein the score for the digital image of tissue of the cancer patient is computed by comparing how cell centers having feature vectors that share a common feature are spatially distributed in the digital image to how cell centers having feature vectors that do not share the common feature are spatially distributed in the digital image.

* * * * *